United States Patent [19]

Pearce

[11] Patent Number: 4,951,584
[45] Date of Patent: Aug. 28, 1990

[54] TRANSPLANTER

[76] Inventor: James E. Pearce, Rt. 1, Box 59, Broken Arrow, Okla. 74012

[21] Appl. No.: 394,528

[22] Filed: Aug. 16, 1989

[51] Int. Cl.$^5$ .................. A01C 11/02; A01B 45/04
[52] U.S. Cl. .................................. 111/101; 111/106; 172/22
[58] Field of Search ............... 111/101, 106, 107, 108, 111/92, 97; 172/22

[56] References Cited

U.S. PATENT DOCUMENTS

| | | | |
|---|---|---|---|
| 235,463 | 12/1880 | Sidwell | 111/101 |
| 433,957 | 8/1890 | O'Meara | 111/101 |
| 960,113 | 5/1910 | Rumble | 111/101 |
| 985,596 | 2/1911 | Jacobs | 111/101 |
| 1,866,073 | 7/1932 | Aberle | 172/22 |
| 1,887,796 | 11/1932 | Boere | 111/101 |
| 2,560,086 | 7/1951 | Clement | 111/101 |
| 2,612,725 | 10/1952 | Casey | 111/101 |
| 3,865,055 | 2/1975 | Gilbaugh | 111/101 |
| 4,836,294 | 6/1989 | Bencriscutto | 172/22 |

Primary Examiner—Danton D. DeMille
Attorney, Agent, or Firm—Head & Johnson

[57] ABSTRACT

A transplanter with a rigid frame has a stationary handle fixed to the upper portion of the frame and an open ended earth corer rigidly fixed to the lower portion of the frame. The corer is an open ended casing of circular horizontal cross-section in which the diameter of any lower cross-section is greater than the diameter of any higher cross-section. As downward and reciprocating rotational forces are exerted on the handle and the core penetrates the earth surrounding a plant, earth nearer to the surface is compacted, facilitating removal of the corer from the earth and removal of the core from the corer. Preferably, the lower edge of the core will be serrated to facilitate the earth cutting process. An ejection assembly is manually vertically reciprocated to press the core downwardly out of the corner. The ejection assembly includes rods which hinge outwardly from the corer so as not to damage plant foliage.

13 Claims, 5 Drawing Sheets

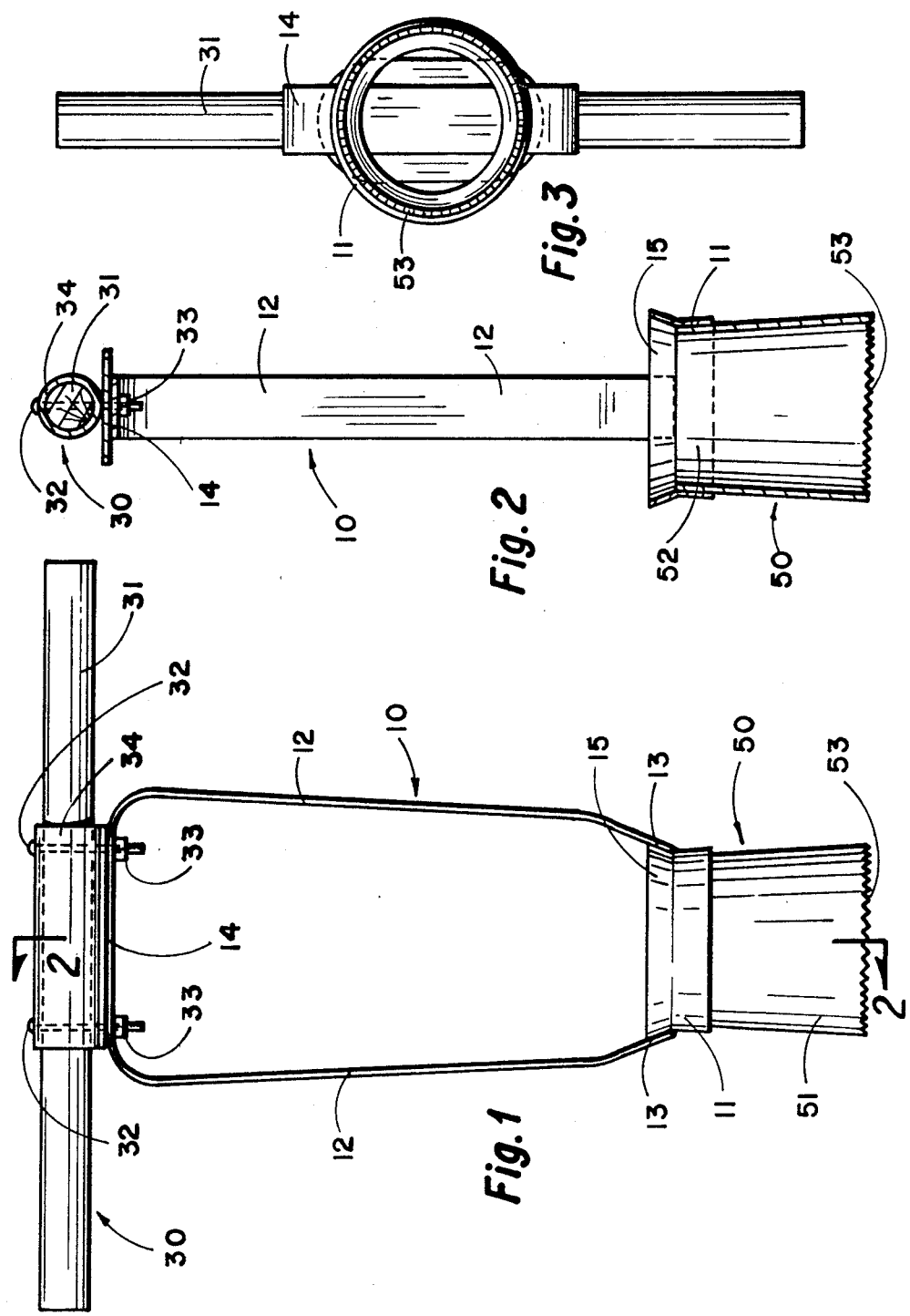

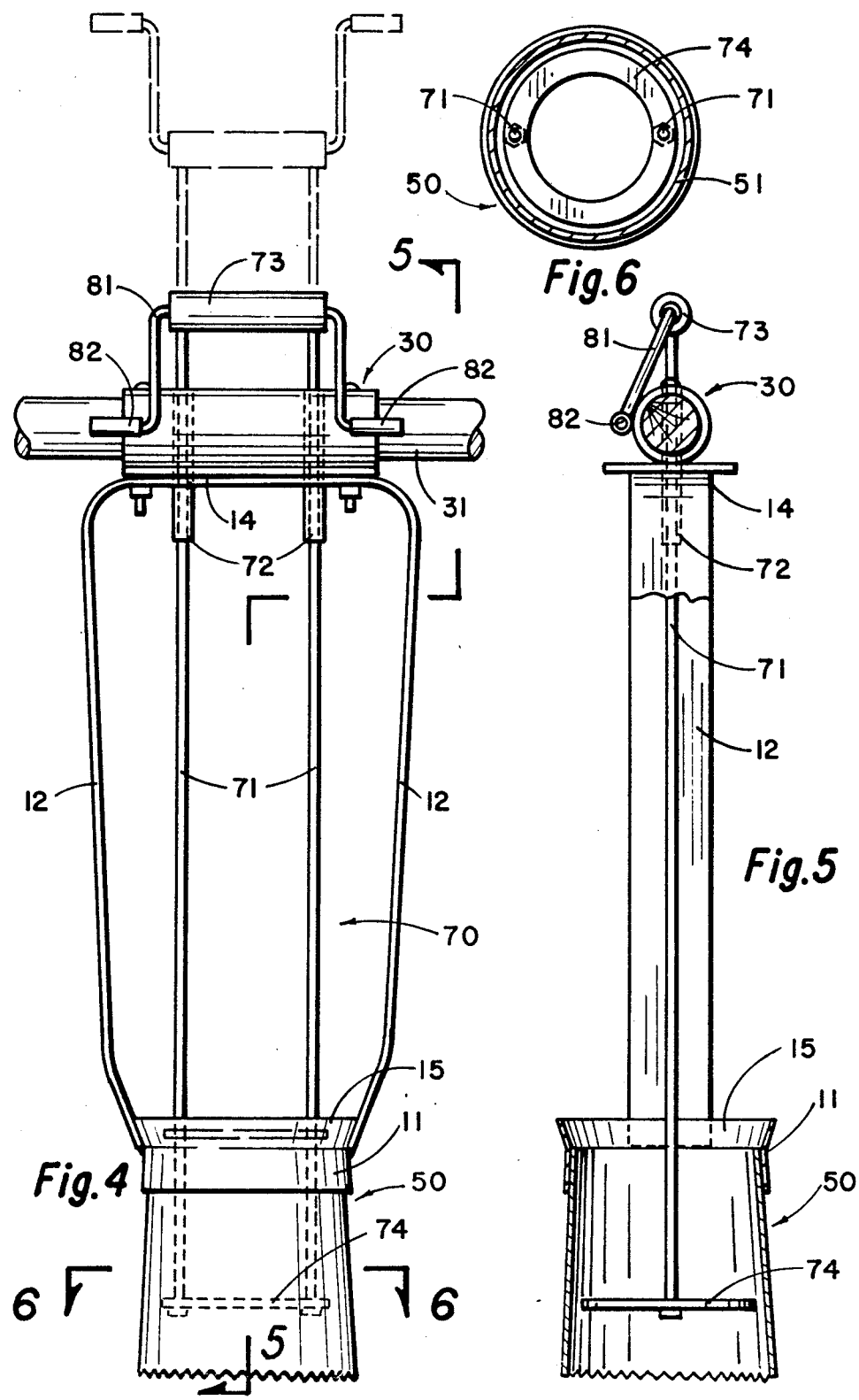

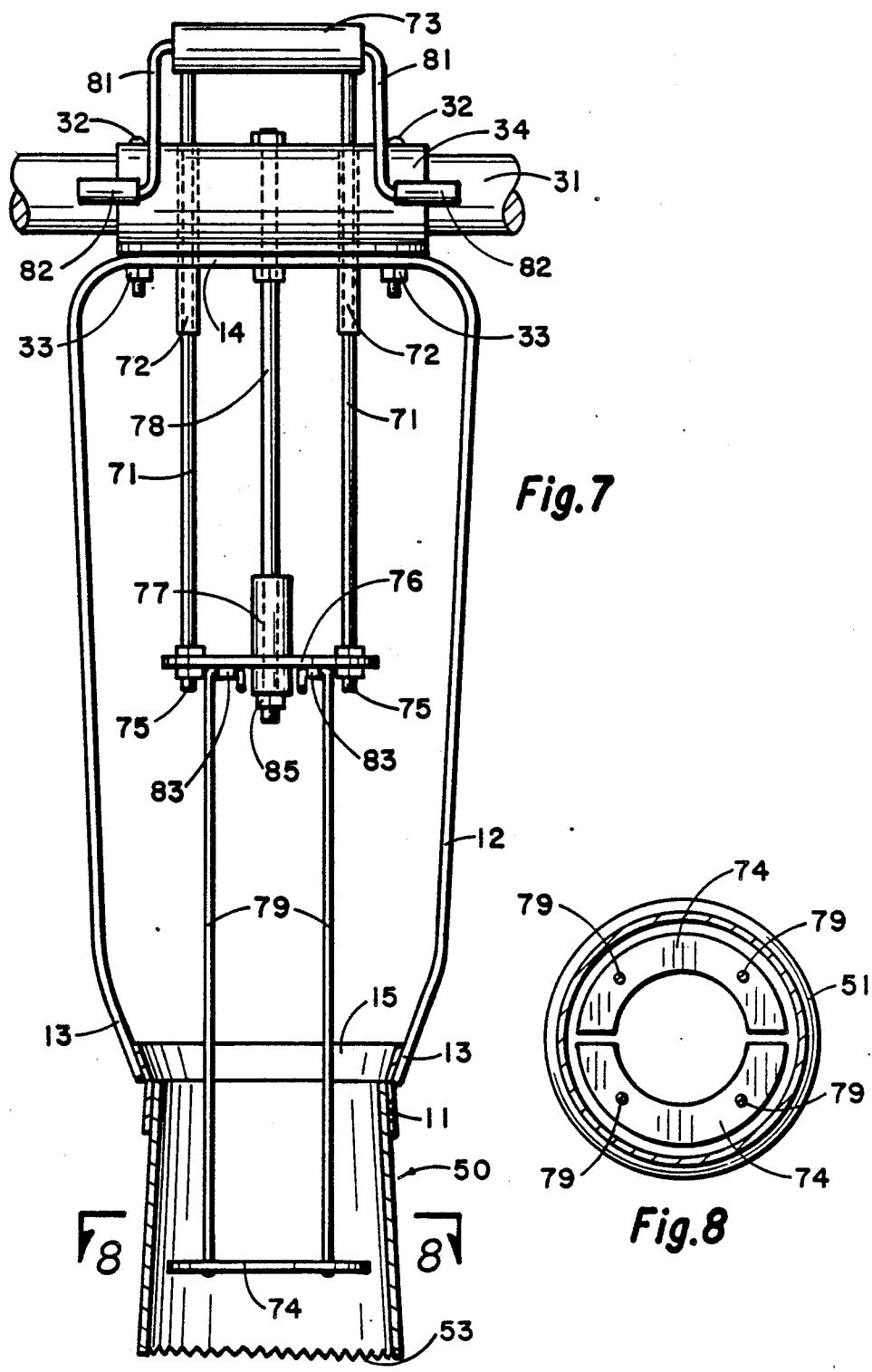

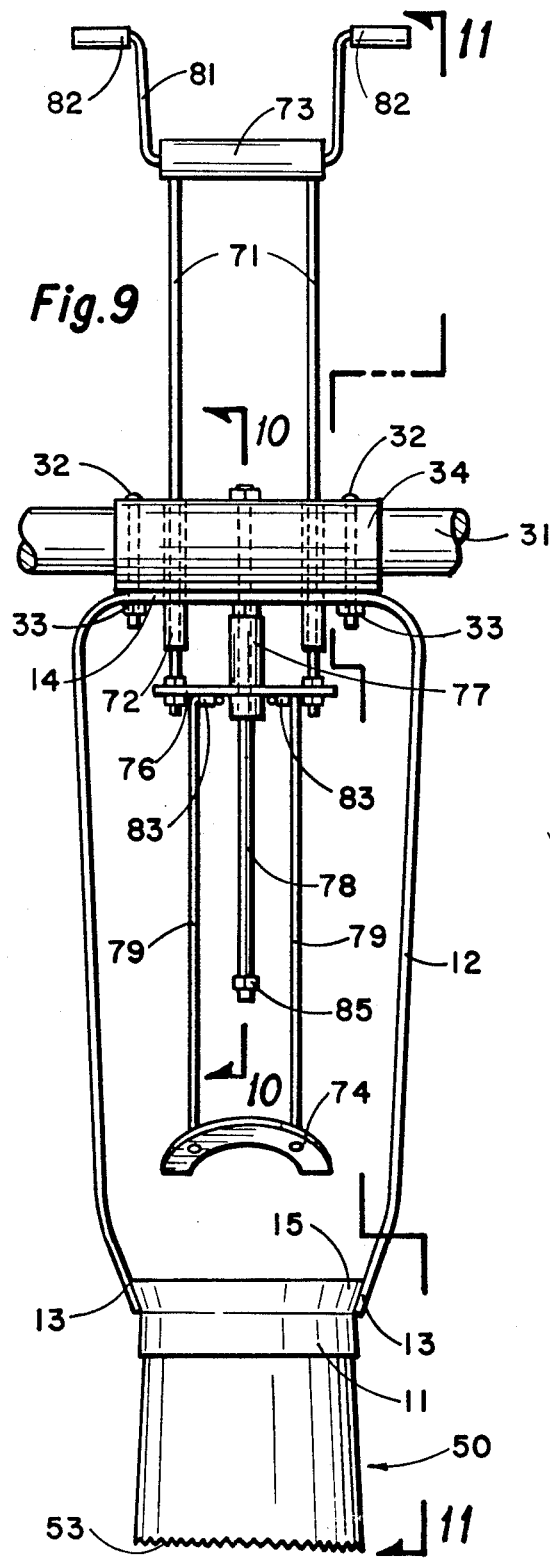
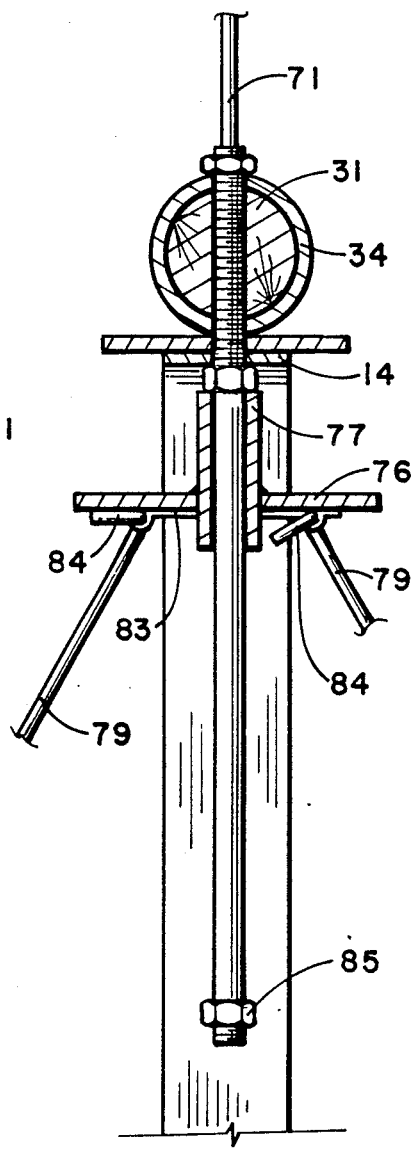
Fig. 9
Fig. 10

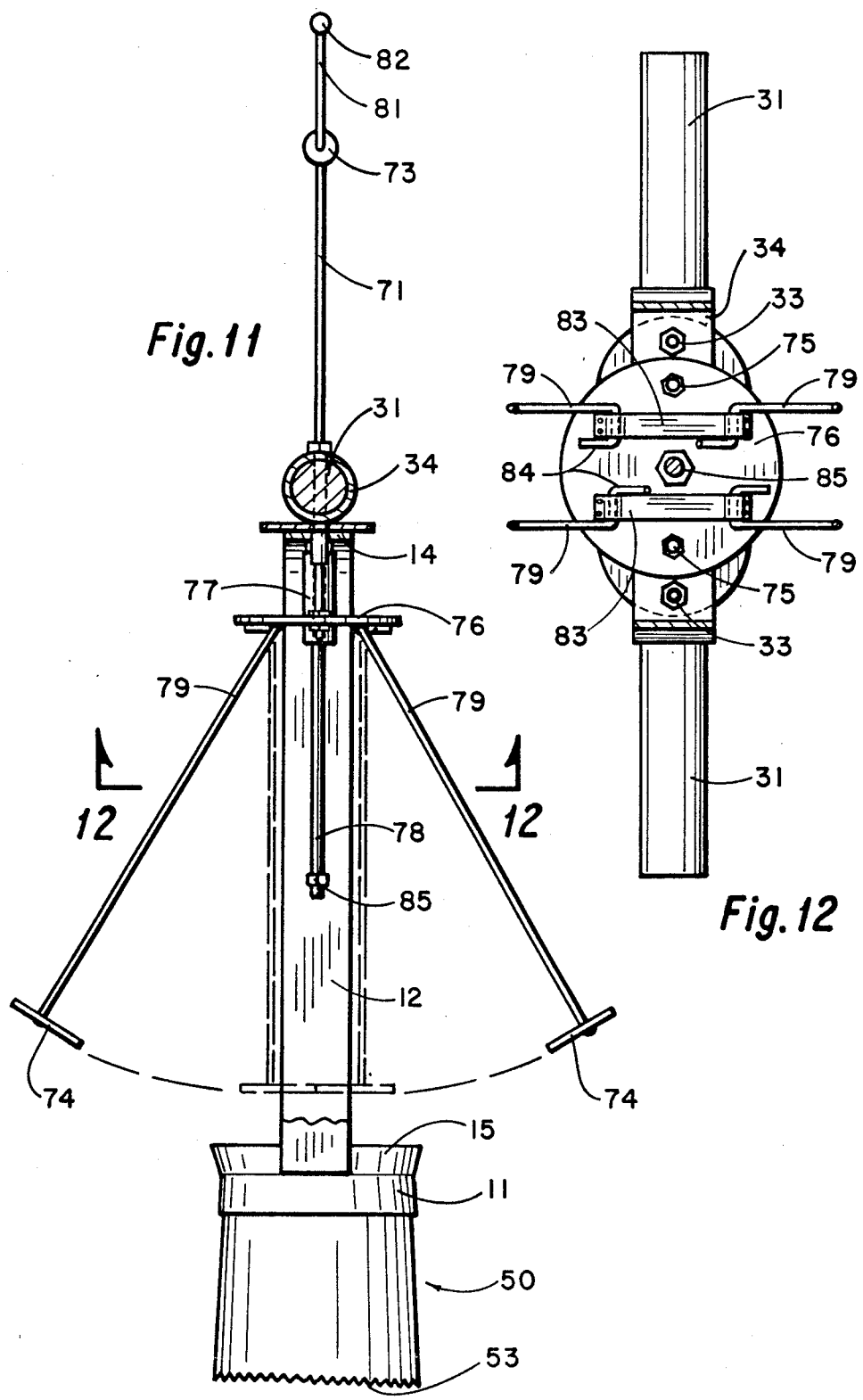

TRANSPLANTER

BACKGROUND OF THE INVENTION

This invention relates generally to gardening implements and more particularly concerns implements used to transplant flowers, bulbs, plants and the like.

Whether it be in a planter box or on a large plot, home gardening has always been a significant source of pleasure for many people. Good garden maintenance requires the transplanting of plants for many reasons, such as aesthetics, changing requirements for space and sun and plant endangering conditions such as pests, frosts or floods. A multitude of devices have been devised over the years to facilitate this transplanting process.

Many such devices incorporate a cylindrical dye which cores the soil around the plant. Such devices require the exercise of a good deal of strength by the gardener because the cylindrical dye remains in full contact with the earth along the entire exterior portion of its inground surface. The resulting frictional forces make penetration into and withdrawal from the earth very difficult. Furthermore, the portion of the earth surrounding the roots of the plant contacts along the interior surface of the cylinder and makes removal of the core from the cylinder difficult. The removal process frequently causes loosening and loss of the earth around the roots of the plant.

Other devices avoid this problem by use of conical coring apparata which taper inwardly toward their bottom end. While these devices are more easily removed from the soil into which they are penetrated, the release of a plant through the smaller bottom section presents new challenges. These types of transplanters therefore frequently include complex linkage arrangements designed to assist in the discharge of the plant and earth from the coring apparatus. For example, many of these devices lever the downwardly tapered conical coring apparatus in some fashion so as to widen the bottom portion in order to release the plant. These operations not only complicate the device itself but also complicate the transplanting process. The difficulty of operation can result in considerable damage and even loss of plants with delicate root systems, such as watermelon, cantaloupe and the like. The loss of time can also be very precious, such as when rapid transplanting in response to a frost warning is necessary.

Accordingly, it is an object of this invention to provide a transplanter which is easily penetrated into the earth, which is easily withdrawn from the earth and which will readily release the earth and plant contained therein. Another object of the invention is to provide a transplanter which facilitates the rapid transplanting of plants. It is also an object of the invention to provide a transplanter which requires exercise of comparatively modest strength and effort by the gardener.

SUMMARY OF THE INVENTION

In accordance with the invention a transplanter is provided which has a rigid frame, a stationary handle fixed to the upper portion of the frame and an open ended earth corer rigidly fixed to the lower portion of the frame. In one preferred embodiment the transplanter also includes an ejection assembly to assist in discharging the plant and earth from the transplanter.

The frame consists of a downwardly and outwardly tapered annular base with a downwardly extending fork fixed at its pronged ends to diametrically opposite sides of the base. The stationary handle is securely fixed to the upper portion of the fork. Preferably, the handle will be an elongated, horizontal rod. The corer has circular, horizontal cross-sections and the diameter of any lower cross-section is greater than the diameter of any respective higher cross-section. The upper portion of the corer is contoured to fit snugly into the base. Preferably, penetration of the corer into the earth is facilitated by the provision of serrations or teeth along the lower edge of the corer. As downward and reciprocating forces are applied to the handle by the user, the corer will penetrate the earth. Since the corer narrows toward the top, the earth around the plant will be compacted as it moves from lower to higher levels in the corer. The removal of the corer from the earth is relatively easy since only the lowermost portion of the corer is in contact with the surrounding earth. The removal of the cored earth from the corer is also facilitated because, given the outward taper of the corer, a minimal downward movement of the earth will cause the entire core to be released and dropped from the corer.

In one preferred embodiment, an ejection assembly includes one or more sliding vertical rods which extend through the upper portion of the frame and the stationary handle. A moving handle is fixed to the upper end of the rods. A flat, horizontal, annular ejector with an outer diameter slightly less than the smallest inner diameter of the base is fixed to the lower end of the rods. Thus, by exertion of a downward force on the moving handle, the annular ejector is pressed downwardly on the earth core to release the core from the corer.

In another preferred embodiment including an ejection assembly, the lower ends of the sliding rods will be connected to a horizontal plate. A guide fixed to the frame aligns the plate for vertical, reciprocal motion with the rods. A pair of swinging rods hinged to the plate extend downwardly to the annular ejector. The ejector is dissected into semi-circular segments, one segment being fixed to each swinging rod. The hinged rods are aligned so that, with the ejector above the base, they may be swung outwardly to opposite sides of the corer so that the annular ejector will not interfere with the passage of the plant through the annular base. As an example of its efficiency and effectiveness, using this embodiment, the inventor was able to transplant 108 tomato plants in a matter of hours without losing a single plant.

BRIEF DESCRIPTION OF THE DRAWINGS

Other objects and advantages of the invention will become apparent upon reading the following detailed description and upon reference to the drawings in which:

FIG. 1 is a front elevation view of a preferred embodiment of the transplanter;

FIG. 2 is a cross-section of the preferred embodiment of the transplanter of FIG. 1, taken along the line 2—2;

FIG. 3 is a bottom view of the preferred embodiment of the transplanter of FIG. 1;

FIG. 4 is a front elevation view of a preferred embodiment of the transplanter including an ejector assembly;

FIG. 5 is a cross-section of the preferred embodiment of the transplanter of FIG. 4 taken along the line 5—5;

FIG. 6 is a cross-section of the preferred embodiment of the transplanter of FIG. 4 taken along the line 6—6;

FIG. 7 is a front elevation view of a preferred embodiment of the transplanter including an alternate ejector assembly;

FIG. 8 is a cross-section of the preferred embodiment of the transplanter of FIG. 7 taken along the line 8—8;

FIG. 9 is a front elevation view of the preferred embodiment of the transplanter FIG. 7 illustrating the ejector assembly in the open condition;

FIG. 10 is a cross-section taken along line 10—10 of FIG. 9;

FIG. 11 is a cross section taken along line 11—11 of FIG. 9 illustrating the ejector assembly in the open condition in solid lines and in the closed condition in dotted lines; and FIG. 12 is a view of a portion of the ejector assembly of FIG. 9 taken along the lines 12—12.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Turning first to FIGS. 1, 2 and 3 a preferred embodiment of the transplanter is illustrated which consists of a rigid frame assembly 10, a stationary handle assembly 30 and a corer 50. The frame assembly includes an annular base 11 which tapers outwardly and downwardly. A fork has tynes 12 which extend downwardly with the prong ends 13 fixed to diametrically opposite sides of the annular base 11. Preferably, the upper portion of the fork will include a horizontal segment 14 which integrally connects the tynes 12. The base 11 and fork may be made of steel and welded at their connecting points, but other rigid materials may also be used. The handle assembly 30 consists preferably of an elongated, horizontal bar or rod, such as a wooden dowel 31, suitably secured to the horizontal segment 14 of the fork, as by bolts 32 and nuts 33. For additional strength, a steel cylinder 34 may be used to encase the dowel 31 at its connection to the horizontal segment 14 of the fork. The corer 50 consists of an open ended steel casing 51 with circular, horizontal cross-sections. The diameter of any lower cross-section is greater than the diameter of any respectively higher cross-section so that the casing 51 flares or tapers outwardly and downwardly. The upper portion 52 of the casing 51 fits snugly into the tapered annular base 11. Preferably, the lower edge 53 of the casing 51 will be serrated to provide teeth to cut into the earth. In the preferred embodiment shown, the casing 51 has the shape of a truncated cone with a base angle ranging from eighty-five to eighty-nine degrees. The smallest inner diameter of the casing 51 will range from three to eight inches and the length of the casing 51 will be in the range from three to ten inches depending upon the depth of the roots of the plants to be transplanted. The casing 51 easily detaches from the annular base 11 to be exchanged for one of different length. For use in especially dry soil conditions, it may be desirable to use replacable pins or pop out rivets (not shown) to hold the casing 51 in place in the base 11. The overall length of the frame assembly 10 will be such that the horizontal handle 31 will lie at a comfortable handgrip position when the casing 51 is rested on the earth.

In the operation of this embodiment of the invention, the exertion by the gardener of downward and reciprocating rotational motion on the handle assembly 30 will cause the corer 50 to make a circular cut in the earth and that the diameter of the upper portion of the cut in the earth. The diameter of the upper portion 52 of the corer 50. Thus, the corer 50 will be readily removed from the cut by the exertion of an upward force on the handle assembly 30. At the same time, as the corer 50 penetrates the earth, the upper portions of the earth will be compacted into the corer 50 in its smaller diameter upper portions. Consequently, in releasing a core from the transplanter, a modest amount of pressure on the top surface portion of the earth within the corer 50 will cause the core to move slightly downward and release the entire core. Generally a downward motion approximating only one-fourth of an inch will suffice.

To transplant any number of plants, the gardener simply prepares a necessary number of holes in new earth using the transplanter to remove and discard the preparatory cores. With the new holes thus prepared, the gardener removes the plant to be transplanted by lowering the corer 50 over the plant to the earth and exerting downward and reciprocating rotational forces on the handle assembly 30. When the corer 50 has sufficiently penetrated the earth, an upward lift on the handle assembly 30 will cause the compacted earth and plant within the corer 50 to be removed from its existing soil for transplanting to its new location. The corer 50 and the plant are then lowered into the new hole. A modest amount of pressure manually or pedally applied to the upper surface of the earth inside the corer 50 releases the plant and the earth into its new location.

Turning to FIGS. 4, 5 and 6, the transplanter shown in FIGS. 1, 2 and 3 has been modified to include an ejection assembly 70. The ejection assembly 70 consists of a pair of sliding rods 71 which extend vertically through holes 72 provided in the handle assembly 30 and horizontal segment 14 of the frame assembly 10. A moving handle 73 is fixed to the upper ends of the rods 71 to facilitate manual reciprocal, vertical motion of the sliding rods 71 within the holes 72. The sliding rods 71 extend downwardly to a flat, horizontal annular ejector 74 which has an outer diameter slightly less than the smallest inner diameter of the annular base 11. The inner diameter of the annular ejector 74 is as large as possible to permit easy disposition of the exposed portion of a plant through the annular ejector 74. The length of the sliding rods 71 is such that, when the rods 71 are fully lowered through the holes 72, the ejector 74 will substantially penetrate into the corer 50. Thus, when a core has been removed from the ground by the corer 50, it may be readily ejected from the corer 50 by the exertion of relatively minimal downward force on the moving handle 73.

Preferably, the handle 73 will include a U-shaped grip 81 having horizontal extensions 82 which turn outwardly at the upper ends of the U. The base of the U is journalled in the handle 73 so that the grip 81 is free to rotate 360° about the handle 73. As shown in FIG. 4, when the grip is rotated to its vertical position, the upward motion of the ejector assembly 70 is facilitated. When the grip 81 is in the downward position, the thumbs and fingers can be used to envelope the fixed handle 31 and grip 82 to facilitate the downward motion of the ejector assembly 70.

In transplanting with this embodiment, the gardener proceeds as earlier explained except that the moving handle 73 is raised upwardly to remove the ejector 74 from within the corer 50 during the coring process. When coring has been completed, the moving handle will be slid downwardly until the ejector 74 rests on the top surface of the earth within the corer 50. With the rotating grip 81 in its downward position, and with the fingers in position for upward lift on the handle 31, slight downward pressure is exerted on the grip extensions 82 with the thumbs to press the ejector 74 against the earth and the corer to release it.

In still another preferred embodiment of the invention, as is shown in FIGS. 7 through 12, the ejection assembly 70 is modified to accommodate plants having larger exposed foliage. In this embodiment the sliding rods 71 are fixed at their lower ends 75 to a horizontal plate 76. The horizontal plate 76 has a vertical sleeve 77 disposed through it. A shaft 78 rigidly extends downwardly from the horizontal segment 14 of the frame assembly 10 between the sliding rods 71 and aligned with the central axis of the corer 50. The shaft 78 extends through the sleeve 77 and operates to guide the motion of the plate 76 in a vertical, reciprocating fashion. Swinging rods 79 are then hingeably suspended beneath the plate 76 and connected to the annular ejector 74. As best seen in FIG. 8, the annular ejector 74 is diametrically dissected so that, as shown in FIG. 11, its semi-circular components can be outwardly swung on the hinged rods 79 to permit larger plants to be inserted through the corer 50 and annular base 11 and between the outwardly swung ejector segments. When the plant is inserted in this position, the swinging rods 79 may be manually swung together to close the annular ejector 74 which will then be aligned for insertion into the corer 50. As shown in FIG. 12, the hinging of the rods 79 may be accomplished by bending the upper ends of the rods into U or S-shaped configurations which are then secured to the underside of the plate 76 by clamps 83 which may be welded or otherwise secured to the plate. The S or U-shaped configurations provide stops 84 to limit the swing range of the rods 79 as is seen in FIG. 10.

In transplanting the gardener proceeds as set forth with respect to the embodiment shown in FIGS. 4, 5 and 6, except that, with the moving handle 73 in its upper position, the rods 79 are outwardly swung to clear the area above the corer 50 so that the transplanter may be set down over the plant without damaging the plant folage. Once the corer 50 has been inserted to its desired depth into the ground and around the plant roots, the rods 79 and ejector segments 74 will be rotated to the closed position in preparation for the ejection process.

The downward motion of the ejector assembly may be limited by a nut 85 fixed at a determined point on the bottom of the shaft 78 which will stop further downward travel of the sleeve 77 which will move into abutment with the nut 85.

To facilitate the operation of the annular ejector 74, an upwardly and outwardly tapered flange 15 may be provided along the upper edge of the annular base 11 so as to guide the movement of the annular ejector 74 into the base 11 and the corer 50.

Thus, it is apparent that there has been provided, in accordance with the invention, a transplanter that fully satisfies the objects, aims and advantages set forth above. While the invention has been described in conjunction with specific embodiments thereof, it is evident that many alternatives, modifications and variations will be apparent to those skilled in the art and in light of the foregoing description. Accordingly, it is intended to embrace all such alternatives, modifications and variations as fall within the spirit of the appended claims.

What is claimed is:

1. A transplanter comprising:
    a rigid frame;
    a stationary handle fixed to the upper portion of said frame;
    an open-ended coring means rigidly fixed to the lower portion of said frame, said coring means having circular horizontal cross-sections, the diameter of any lower cross-section of said coring means being greater than the diameter of any respective higher cross-section of said coring means;
    a pair of sliding, vertical rods disposed for selective reciprocable motion in relation to the upper portion of said frame and said handle and having a reciprocating handle fixed to the upper ends thereof and a horizontal plate fixed to the lower ends thereof;
    a pair of swinging vertical rods hinged to and extending downwardly from said plate and having means disposed on the lower ends thereof aligned for removable, downward penetration into the upper portion of said coring means;
    a vertical sleeve disposed through said plate cooperable with a vertical shaft fixed to the upper portion of said frame and extending through said sleeve for guiding the reciprocation of said plate.

2. A transplanter according to claim 1, said coring means having the shape of a truncated cone.

3. A transplanter according to claim 2, said coring means having a serrated lower edge.

4. A transplanter according to claim 3, said frame comprising an outwardly, downwardly tapered truncated conical base of diameter and slope to snugly receive the upper portion of said coring means therein and a forked member extending downwardly with its lower ends fixed to diametrically opposite sides of said base.

5. A transplanter according to claim 4, said stationary handle comprising an elongated horizontal bar.

6. A transplanter according to claim 1 further comprising a second penetrating means and a second pair of swinging vertical rods hinged to and extending downwardly from said plate to said second penetrating means.

7. A transplanter according to claim 6, said first and second penetrating means each comprising flat, horizontal crescent members.

8. A transplanter according to claim 7, said crescent members being semi-circular.

9. A transplanter according to claim 8 further comprising an outwardly turned flange extending along the upper perimeter of said truncated conical base.

10. A transplanter comprising:
    a downwardly, outwardly tapered annular base;
    a rigid, downwardly extending fork having its prong ends fixed to diametrically opposite sides of said base;
    an elongated, horizontal, stationary handle fixed to the upper portion of said fork;
    a shaft extending downwardly from the upper portion of said fork and coaxially with respect to said base to approximately the mid-point of said fork;

a pair of slidable rods vertically disposed through said stationary handle and the upper portion of said fork, one on either side of said shaft;

a moving handle fixed to the upper ends of said slidable rods;

a horizontal plate fixed to the lower ends of said slidable rods;

a sleeve fixedly disposed through said plate and aligned for reciprocal, vertical motion on said shaft in response to forces exerted on said moving handle;

a flat, horizontal, diametrically dissected annular ejector of outer diameter less than the smallest inner diameter of said base;

a pair of swingable means hinged to said plate and extending downwardly, one to each half of said ejector, said means being of length to permit substantial penetration of withdrawal of said ejectors through said base as said sleeve is fully downwardly or upwardly reciprocated, respectively, and oriented to permit hingable rotation of said ejector halves outside the perimeter of said base; and an earth corer having an upper portion contoured to snugly fit into said base, said corer having circular, horizontal cross-sections such that the diameter of any lower cross-section of said corer is greater than the diameter of any respective higher cross-section of said corer and having a serrated lower edge whereby, when downward and reciprocating rotational forces are transmitted from said stationary handle through said frame and said corer to the earth therein and whereby, when downward forces are transmitted from said moving handle through said slidable rods, said plate hold swinging rods and said ejector to the compacted earth within said corer, the compacted earth is readily ejected from said corer.

11. A transplanter according to claim 10 further comprising a stop fixed to the lower end of said shaft to limit the downward motion of said sleeve.

12. A transplanter according to claim 10 further comprising an outwardly turned flange extending along the upper perimeter of said annular base.

13. A transplanter according to claims 10 or 11 said corer having the shape of a truncated cone.

* * * * *